United States Patent [19]

Huynh

[11] Patent Number: 4,760,736
[45] Date of Patent: Aug. 2, 1988

[54] ON BOARD INDICATOR FOR MOTOR VEHICLES

[75] Inventor: Tan D. Huynh, Champs sur Marne, France

[73] Assignee: Veglia, Paris, France

[21] Appl. No.: 946,913

[22] Filed: Dec. 22, 1986

[30] Foreign Application Priority Data

Dec. 30, 1985 [FR] France .............................. 85 19396

[51] Int. Cl.[4] .............................................. G01D 3/02
[52] U.S. Cl. ........................................ 73/430; 340/59; 73/308; 73/313
[58] Field of Search .......................... 73/430, 308, 313; 340/56, 59, 60

[56] References Cited

U.S. PATENT DOCUMENTS 3,813,946  6/1974  Robbins, Jr. et al. ................. 73/430
4,078,751  3/1978  Stalzlechner ..................... 73/430 X

FOREIGN PATENT DOCUMENTS 1503029  10/1967  France .

OTHER PUBLICATIONS

M. Bozoian, *Power-Up Relays Prevent Meter From Pinning*, Electronics International, vol. 53, No. 19 (Aug. 1980, p. 157).

*Primary Examiner*—Tom Noland
*Attorney, Agent, or Firm*—Lowe, Price, Leblanc, Becker & Shur

[57] ABSTRACT

An on board indicator for vehicles is provided, including a sensor detecting a physical magnitude to be indicated, connected to a display device through a low pass filter whose cut off frequency is increased for a given time after switch on of the vehicle, by appropriate circuitry. A threshold detector controlling an alarm device is connected to the output of the low pass filter. Such an indicator may be used for indicating the fuel level in the reservoir of a motor vehicle, for example.

6 Claims, 2 Drawing Sheets

ON BOARD INDICATOR FOR MOTOR VEHICLES

BACKGROUND OF THE INVENTION

1. Field of the Invention

The present invention relates to an on board indicator for vehicles, for controlling the slow variations of a physical magnitude affected by rapid parasite variations, including a sensor for sensing said physical magnitude, including an electric signal output corresponding to the physical magnitude, means connected to said sensor for displaying said output magnitude and means for damping the parasite variations of the indication thus obtained of said physical magnitude.

Such an indicator is used, for example, for indicating the level of fuel in the reservoir of any vehicle, particularly a motor vehicle.

In such a case, it is important to be able to check the mean level in the reservoir, whose variations are slow with respect to the rapid parasite variations caused by the movements of the vehicle.

2. Description of the Prior Art

Such on board indicators are already known, in which the display means include a needle apparatus of the galvanometer type with moving coil, and the damping means includes a device for mechanically damping the moving coil, using, for example, viscous friction. Since the damping thus obtained is sometimes insufficient, and when the sensor includes a movable mechanical member, such for example as a float in the case where the magnitude to be indicated is a level, another device is provided for damping this movable member mechanically by viscous friction or inertia. These devices have the following drawback. In order to obtain sufficient damping of the parasite variations when the vehicle is running normally, they must be adjusted in a way such that the result is a false indication in the time period immediately following switching on of the ignition of the vehicle. In fact, the mobile frame cannot move rapidly for the needle to overcome almost instantaneously the discontinuity corresponding to switching on of the ignition of the vehicle. In addition, viscous or inertia damping devices are relatively expensive.

The present invention aims at overcoming the above drawbacks.

SUMMARY OF THE INVENTION

To this end the invention provides an indicator of the above defined type wherein said damping means include a low pass electric filter disposed between said sensor and said display means and means, controlled for a given time after switching on of the vehicle, for increasing the cut off frequency of said filter.

In the indicator of the invention, it is not necessary for the display means themselves to have a mechanical damping device for, when the vehicle is running normally, the parasite variations are sufficiently damped by the electric low pass filter. Thus, for the given time following switching on of the ignition of the vehicle, with the cut off frequency of the low pass filter increased, the display means, undamped in themselves, may rapidly follow the discontinuity corresponding to switch on. During this time, the vehicle is not yet moving and the parasite variations are very small if not zero. Thus, the indicator of the invention gives an indication which is always exact. In addition, it is relatively inexpensive.

In a preferred embodiment of the indicator of the invention, said electric low pass filter includes a resistor and a capacitor and said means for increasing the cut off frequency of said filter includes an analog switch connect in parallel across the resistor and controlled to short circuit the resistor for a given time after the vehicle is turned on.

Advantageously, said analog switch includes a transistor.

Advantageously still, a threshold detector is provided which is connected to the output of said low pass filter and an alarm device connected to the output of said threshold detector.

In this case, it is no longer necessary to provide a special device for detecting that the reservoir is empty, as in the prior art systems, which allows the mechanical damping proper to this device, among other things, to be omitted. Furthermore, the information delivered by the alarm device, because it is derived from the input magnitude of the display means, is always in agreement with the displayed indication.

BRIEF DESCRIPTION OF THE DRAWINGS

The present invention will be better understood from the following description of one embodiment of an on board indicator according to the invention, with reference to the accompanying drawings in which.

DESCRIPTION OF THE PREFERRED EMBODIMENTS

Figure 1:
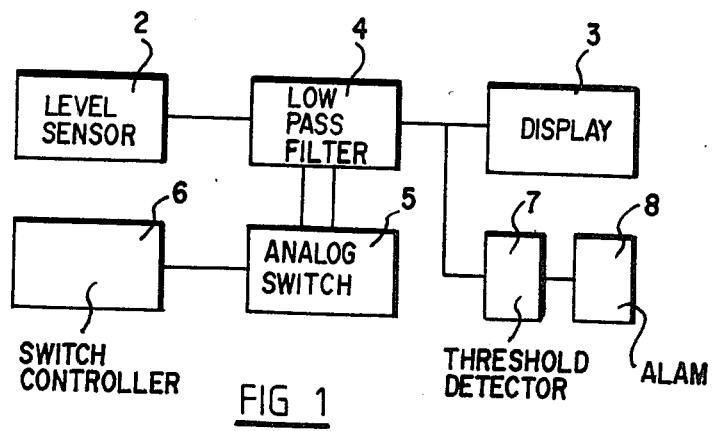
FIG. 1 shows a block diagram of an on board indicator.

An indicator for indicating the fuel level in the reservoir of a vehicle comprises, with reference to FIG. 1:
- a level sensor 2, disposed in the fuel reservoir, whose output magnitude is here an electric voltage,
- a low pass filter 4 connected to the output of the level sensor 2,
- a display device 3 connected to the output of the low pass filter 4.
- a threshold detector 7 connected to the output of the low pass filter 4,
- an alarm device 8, here an indicator lamp, connected to the output of the threshold detector 7,
- an analog switch 5 connected to the low pass filter 4 in a way to be described in detail subsequently, and
- a device 6 for controlling the analog switch 5.

Figure 2:
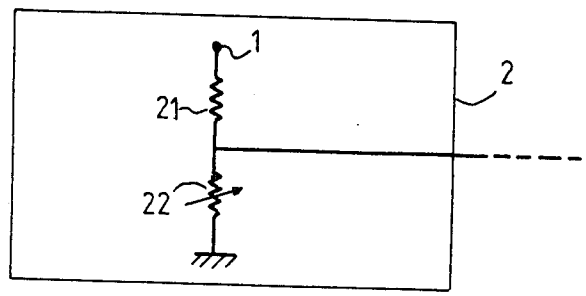
FIG. 2 shows in a simplified way the sensor of the indicator of FIG. 1.

Referring to FIG. 2, level sensor 2 comprises a potentiometer 22, adapted in a way known per se, and so not shown, so that its total resistance depends on the level of fuel in the reservoir, for example by means of a float integral with the member controlling the slider of the potentiometer. The potentiometer 22 is connected in series with a resistor 21 of fixed value so as to form a divider bridge supplied with voltage from the battery, available at a terminal 1 after the vehicle electrical system is turned on. The junction point between resistors 21 and 22 forms the output of the level sensor 2.

Figure 3:
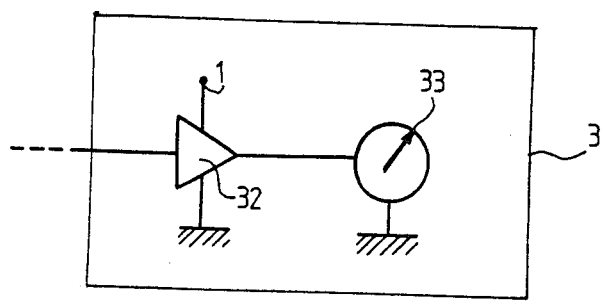
FIG. 3 shows in a simplified way the display device of the indicator of FIG. 1.

Referring to FIG. 3, display device 3 here includes a follower amplifier 32 of known type, fed from terminal 1, the output of which is connected to moving coil apparatus 33. Follower amplifier 32 provides a very high input impedance to display device 3.

Figure 4:
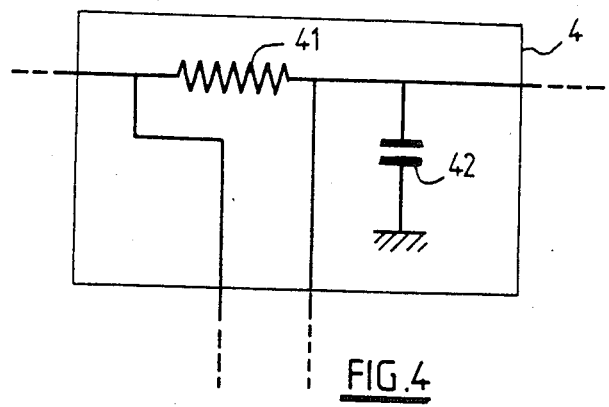
FIG. 4 shows the low pass filter of the indicator of FIG. 1.

Referring to FIG. 4, low pass filter 4 is of a known type comprising a series resistor 41 and a shunt capacitor 42. The two terminals of resistor 41 are connected to the analog switch 5 in the way now to be described.

Figure 5:
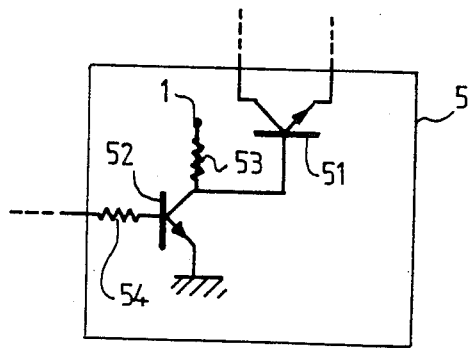
FIG. 5 shows the analog switch of the indicator of FIG. 1.

Referring to FIG. 5, the analog switch 5 here includes a first NPN bipolar transistor 51, whose emitter is connected to the terminal of resistor 41 connected to capacitor 42 and whose collector is connected to the other terminal of resistor 41. The base of transistor 51 is connected to the collector of a second NPN bipolar transistor 52, fed from terminal 1 through resistor 53. The emitter of the NPN transistor is connected to ground and its base is connected, through a resistor 54, to a control input of the analog switch 5.

Figure 6A:
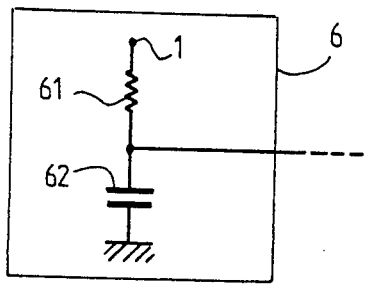
FIG. 6a shows a first variant of the device for controlling the indicator of FIG. 1.

Referring to FIG. 6a, the control input of the analog switch 5 is connected to the junction point between a resistor 61 and a capacitor 62 connected in series for forming a timer of known type, resistor 61 being connected to terminal 1 and capacitor 62 being connected to ground.

Figure 6B:
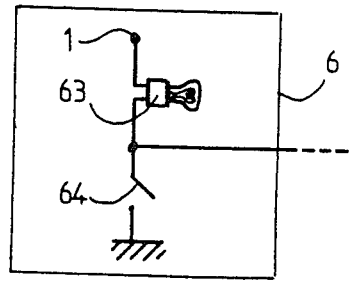
FIG. 6b shows a second variant of the device controlling the indicator of FIG. 1.

Referring to FIG. 6b, a variant of the control for the analog switch 5 is shown, for use where the motor of the vehicle, being lubricated by means of oil, is provided with a contactor 64, or "pressure contact", controlled by the oil pressure gauge. This pressure contact 64 is in general disposed in series with an indicator lamp 63, the whole being fed from terminal 1. The pressure contact 64 remains closed for a certain time after the vehicle is started and then opens. In such a case, it is possible to connect the control input of the analog switch 5 directly to the junction point between the pressure contact 64 and the indicator lamp 63.

The indicator which has just been described operates in the following way. As soon as the vehicle is started, terminal 1 is brought to a potential, here 12 volts, and all the circuits are supplied with power. In the case of FIG. 6a, as in that of FIG. 6b, the input voltage of analog switch 5 is at a zero level or a level very close to zero, for a period of time which depends on the time constant of the timer of FIG. 6a or on the time after which the oil pressure opens the pressure contact, in the case of FIG. 6b. As long as the input voltage of analog switch 5 is at a low level, the output voltage of the inverter formed by transistor 52 and resistors 53 and 54 remains close to the voltage at terminal 1, namely 12 volts. Then transistor 51 is saturated and resistor 41 is therefore short circuited. In this case, the cut off frequency of the low pass filter 4 is shifted to a very high value, sufficient to allow the filter to transmit the sudden voltage discontinuity at the output of sensor 2 corresponding to switch on. The undamped display device 2 may follow this variation and therefore display an exact value almost instantaneously.

After a given time, capacitor 62 is sufficiently charged, or the pressure contact 64 is open, and the voltage at the input of the analog switch 5 becomes high enough for transistor 52 to switch and the base potential of transistor 51 to be close to zero. Transistor 51 is no longer conductive, which results in resistor 41 being effectively placed back into the circuit giving low pass filter 4 a relatively low cut-off frequency value. The low cut-off frequency attenuates the rapid parasite variations related to the movements of the vehicle during running thereof, of the level of the fuel in the reservoir, and for transmitting the slow variations representative of the amount of fuel present in the reservoir.

When the output voltage of filter 4 is below the threshold of the threshold detector 7, the alarm device 8 is tripped, warning the drive that the level in the reservoir is close to zero.

Naturally, the present application is not limited to the embodiment which has just been described. Thus for example any known sensor detecting a physical magnitude to be indicated, with electric output magnitude, may be used in place of sensor 1 described.

Similarly, any display device, in particular of the alpha numeric character type, may be used instead of the display device 3. The bipolar transistor 51 could be replaced by a field effect transistor, or else by a relay, for example.

What is claimed is:

1. An on board indicator for vehicles, for checking the slow variations of a physical magnitude affected with rapid parasite variation, including a sensor detecting said physical magnitude, with electric output magnitude, means connected to said sensor for displaying said output magnitude and means for damping the parasite variations of the indication thus obtained of said physical magnitude, wherein said damping means include an electric low pass filter disposed between said sensor and said display means and means, controlled for a given time after switch on of the vehicle, for increasing the cut off frequency of said filter.

2. The indicator as claimed in claim 1, wherein said electric low pass filter includes a resistor and a capacitor, and said means for increasing the cut off frequency of said filter include an analog switch connected in parallel across the resistor and controlled for a given time after switch on of the vehicle for short circuiting said resistor.

3. The indicator as claimed in claim 2, wherein said analog switch includes a transistor.

4. The indicator as claimed in one of claim 1, wherein the vehicle is provided with a terminal supplied with electric energy after switch on of the vehicle, a timer being provided connected to said terminal and said analog switch being controlled by the output of said timer.

5. The indicator as claimed in claim 1, wherein the vehicle is provided with a motor lubricated by oil and a contactor is controlled, in a way known per se, by an oil pressure gauge for closing an electric circuit for a given time after switch on of the vehicle and said analog switch is controlled by said contactor.

6. Indicator as claimed in claim 1, wherein a threshold detector is provided connected to the output of said low pass filter and an alarm device is connected to the output of said threshold detector.

* * * * *